United States Patent [19]
Mizumoto et al.

[11] Patent Number: 6,055,382
[45] Date of Patent: *Apr. 25, 2000

[54] APPARATUS HAVING A JUDGING DEVICE WHETHER A FILM FRAME IS EXPOSED OR NOT

[75] Inventors: Kenji Mizumoto, Osaka; Satoshi Hamada, Habikino, both of Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/788,468

[22] Filed: Jan. 29, 1997

[30] Foreign Application Priority Data

Jan. 31, 1996 [JP] Japan ................................. P 8-38780
Jan. 31, 1996 [JP] Japan ................................. P 8-38781
Jan. 31, 1996 [JP] Japan ................................. P 8-38782

[51] Int. Cl.$^7$ ................................................ G03B 17/24
[52] U.S. Cl. ......................... 396/210; 396/319; 396/311
[58] Field of Search ................................. 396/210, 310, 396/311, 319, 389–390

[56] References Cited

U.S. PATENT DOCUMENTS

| | | | |
|---|---|---|---|
| 5,281,987 | 1/1994 | Nagata | 396/319 |
| 5,416,545 | 5/1995 | Izukawa | 396/319 |
| 5,614,969 | 3/1997 | Izukawa | 396/319 |
| 5,617,161 | 4/1997 | Serita et al. | 396/319 |

*Primary Examiner*—Safet Metjahic
*Assistant Examiner*—Michael Dalakis
*Attorney, Agent, or Firm*—Burns, Doane, Swecker & Mathis, LLP

[57] ABSTRACT

An apparatus having a judging device judges whether a film frame is exposed or not by detecting that a magnetically recorded signal exists or not on a magnetic recording section arranged correspondingly on each frame of a film. The device judges, when it is judged that one frame is an unexposed frame by detecting no recorded signal on the magnetic recording section, whether a following frame is exposed or not. And, if it is judged that the following frame is also an unexposed frame, it is judged that the previous frame is not exposed. Thus, an accurate judgment of an unexposed frame and film feeding of a head frame of unexposed frames to a photographing position can be achieved.

24 Claims, 11 Drawing Sheets

1 mS 1 mS

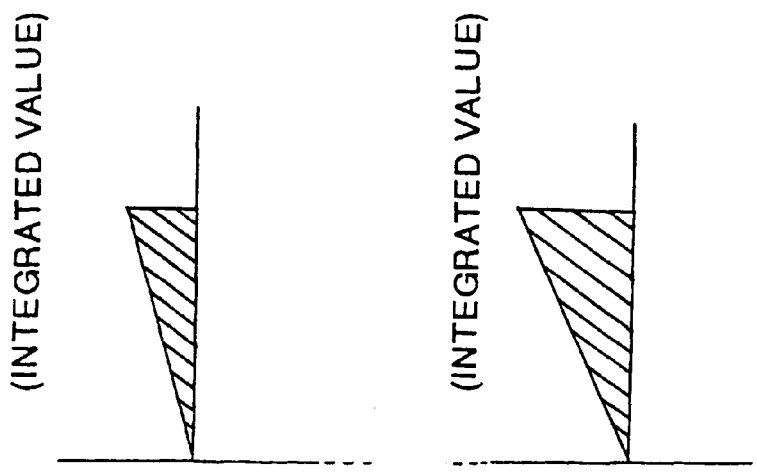
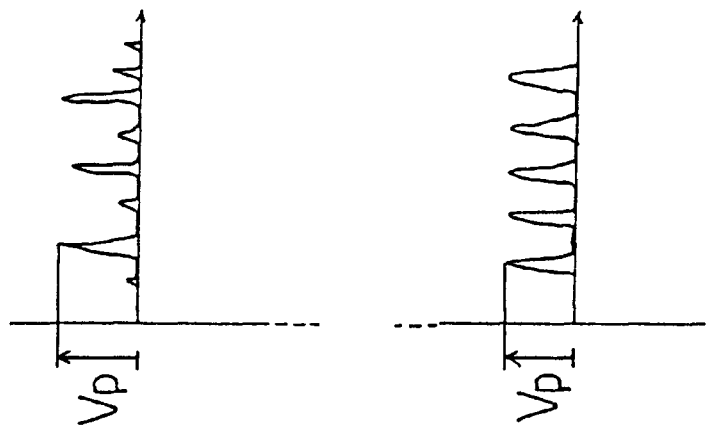
FIG. 5(a) NOISE
FIG. 5(b) SIGNAL

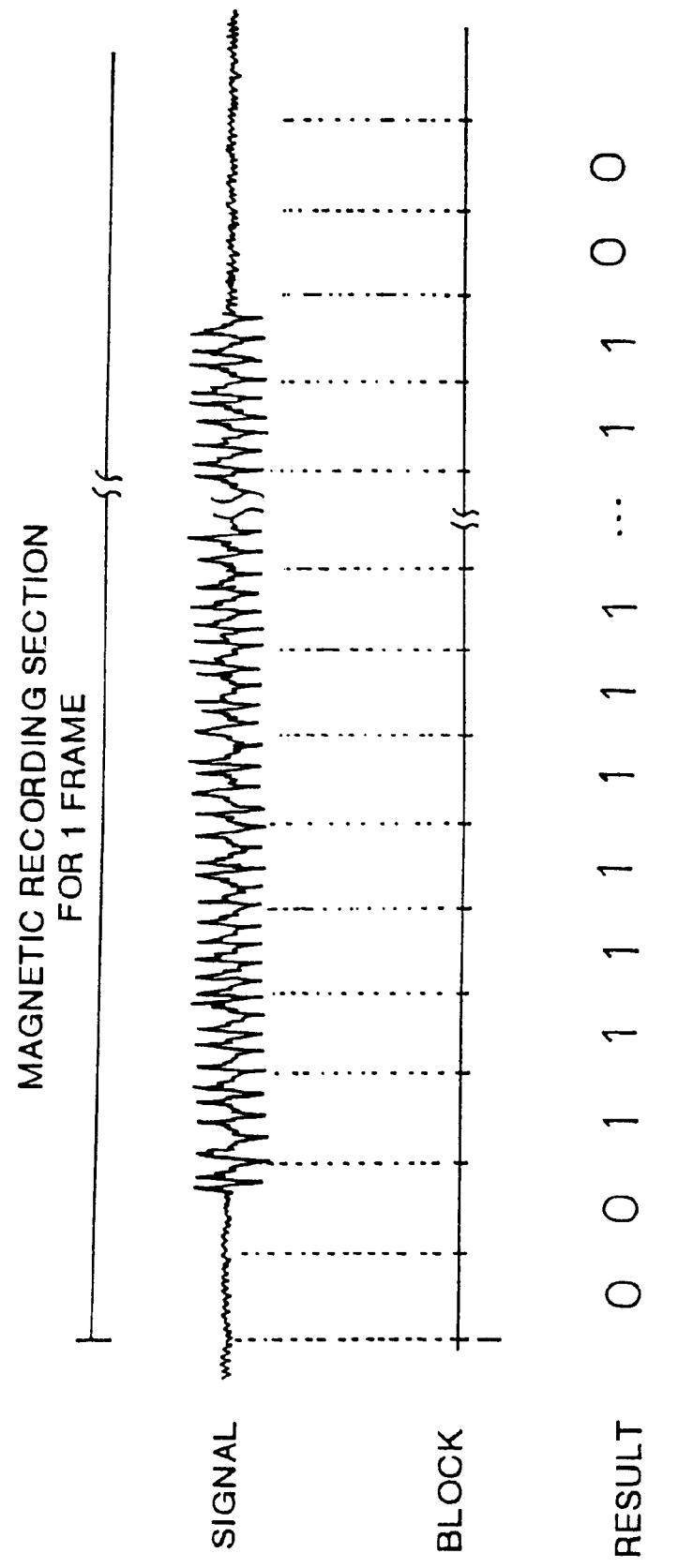

F I G. 7
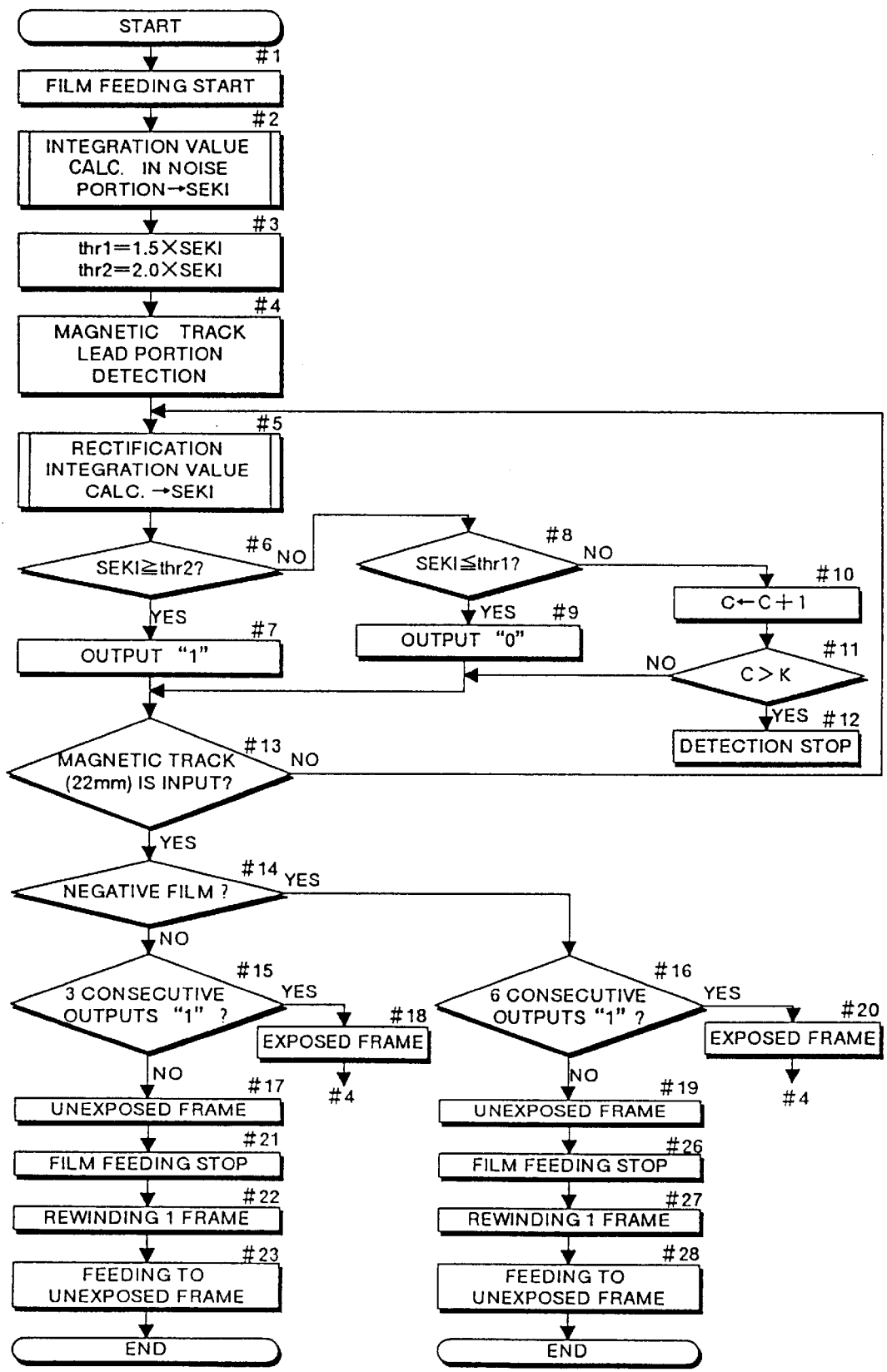

APPARATUS HAVING A JUDGING DEVICE WHETHER A FILM FRAME IS EXPOSED OR NOT

BACKGROUND OF THE INVENTION

1. Field of the Invention

This invention relates to an apparatus having a device which judges whether a frame is exposed or not in a film, wherein photographing information is recorded at a recording section, which is arranged correspondingly to each film frame, when the film frame is exposed.

2. Description of the Prior Art

Conventionally, a camera has been known wherein a film, which is contained in a cartridge and provides a recording section capable of recording photographing information on each film frame correspondingly, is loaded, and magnetic recording is executed on the recording section, feeding out the film from the cartridge. In such a camera, the camera is capable of re-using a film after rewinding it in a state in which not all of the frames are photographed (exposed), and loading the film cartridge again in the camera, and feeding the film out to an unexposed frame. In order to re-use a film in this manner, the camera needs to have a functional construction for detecting a recorded information signal in a recording section corresponding to each film frame, and judging whether the frame is exposed or not.

However, according to such an above-mentioned recording section made of magnetic substance and the like, which is provided on a photographing film for a camera, it is difficult to pick up signal strength efficiently in characteristics of magnetic recording and outputting, compared with a magnetic recording tape used for an ordinary audio cassette tape recorder and the like. Therefore, even though a magnetic signal is recorded on the recording section, it tends to be difficult to judge whether a magnetic signal is recorded or not by comparing small and large portions in the signal's amplitude because a signal to noise ratio (hereinafter refers to as S/N ratio) is likely to be reduced due to a small difference in the amplitude of noise portion and magnetic signal portion.

For example, in FIG. 4, FIG. 4 (a) shows a magnetic output in a noise portion, and FIG. 4 (b) shows a magnetic output in a signal portion. At the noise portion, noise of a motor, CRT and the like peripheral to the recording section is picked up, and at the signal portion, a reduction of magnetic output signal is caused by azimuth variations of a magnetic head and unevenness in the operation of electronic components of a circuit. As a result, the S/N ratio is reduced. Further, when the magnetic output signal at the signal portion is reduced as a whole, there is little signal which is beyond a threshold value and hence it may be judged incorrectly.

Furthermore, if a detection whether a magnetic recording exists or not is executed regardless a kind of film, it is likely to be an incorrect detection, because the magnetic output signal level varies considerably due to difference in characteristic of a kind of film (for example, negative films or positive films).

Furthermore, there is an abnormality in which only one part of film frames is not exposed or signal level of magnetic recording is reduced in the middle of exposed frames. In such cases, this problem is likely to cause an incorrect operation if such abnormal frame, which is detected as an unexposed film at first, is fed to its lead portion immediately after judging whether a frame is not exposed or exposed by analyzing the frames one by one.

SUMMARY OF THE INVENTION

This invention is made to solve the above-mentioned problems. An object of the present invention is to provide an apparatus having a judging device of an unexposed film frame, which judges whether a film frame is exposed or not by detecting whether a recorded information exists or not at a recording section arranged correspondingly on each film frame. According to the apparatus, the apparatus is able to detect effectively whether a recorded signal exists or not even though there is a reduction of S/N ratio at a signal portion and noise portion, and judge correctly whether a film frame is exposed or not.

Another object of the present invention is to provide an apparatus which is able to detect effectively whether a recorded signal exists or not and to judge correctly whether a film frame is exposed or not even though there is a reduction of S/N ratio by changing a detection procedure in accordance to a kind of film or an output signal level.

A further object of the present invention is to provide an apparatus which is able to prevent a double exposure even if there is an abnormality such that only one portion of frames is not exposed between other photographed frames, by not judging immediately that a frame is not exposed even though the film is detected as an unexposed frame at first, and detecting whether an information signal exists or not in the following frames.

To accomplish the above-mentioned objects, the apparatus having a device which judges whether a frame is exposed or not based on whether a recorded signal exists or not at a recording section, which is arranged on each film correspondingly, and wherein photographing information is recorded when a frame is exposed, comprises: a film feeder for feeding a film, a signal detection device for detecting signals of photographing information of a film frame at a recording section. When the film is fed by the film feeder, a signal judgment device for judging whether signals of photographing information exist or not at frames based on the signal detected by the signal detection device and judging a signal again with respect to the following frame when a frame is detected as having no signal as a result of the judgment, and a frame judgment device for judging whether the frame is not exposed or exposed based on the result of judgment by the signal judgment device. The above-mentioned signal judgment device may be one that divides signals, which are detected by the signal detection device, into a plural blocks, judges whether an information signal exists or not at every block, and changes the detection manner of signal detection in accordance with the detected signal level or a kind of a film. Furthermore, the signal judgment device may be one that judges whether the information signal exists or not at frames based on a result of integration by an integration means, which rectifies and integrates signals detected by the signal detection device.

In the above-mentioned construction, the apparatus is able to detect a recorded signal of a film using the signal detection device during feeding of the film, and the signal detection device judges whether a signal exists or not at frames based on the detected signal; Further the apparatus whether a signal exists or not at the following frame when a frame is judged to have no signal, and the frame judgment device judges whether the frame is not exposed or exposed based on the result of the judgment. By judging a signal in this manner, the apparatus is able to judge accurately whether a signal exists or not, and feed an unexposed frame to its lead portion even if there is an abnormality such that a part of the frames are not exposed between exposed frames. In addition, according to the above-mention structure, the apparatus is able divide the detected signal into a plural blocks, and the signal judgment device judges whether an information signal exists or not at every block and the apparatus changes the signal detection manner in accordance with the detected signal level or a kind of a film, and the frame judgment device judges whether the frame is not exposed or not based on a result of the judgment. By judging a signal in this manner, the apparatus is able to judge whether a signal exists or not accurately regardless of a detected signal level or a kind of a film. Here, as for a kind of film, it may be negative film, positive film or other, type of film and the judgment whether a signal exists or not may be changed in accordance with characteristics of each film. Furthermore, in an apparatus having the above-mentioned structure, the apparatus is able to detect a signal at the recording section of a film by the signal detection device, and the detected signal is rectified and integrated by the integration means. Based on a result of the integration, the signal judgment device judges whether an information signal exists or not at frames and the apparatus judges whether a frame is not exposed or exposed based on a result of the judgment. By judging a signal in this manner, the apparatus is able to judge whether frames are exposed or not effectively by integrating a signal at each signal and noise portions so that differences in the amplitude stand out between signal and noise portions, even if there is a reduction of S/N ratio due to a decreased amplitude in the signal portion and an increased amplitude at noise portion.

BRIEF DESCRIPTION OF THE DRAWINGS

FIG. 6 is a view showing a state of judging whether a magnetic signal exists or not by dividing a signal at a magnetic recording section into a plural block units, FIG. 7 is a main flowchart showing the first example of judging proceedings for unexposed frames.

DETAILED DESCRIPTION OF THE PREFERRED EMBODIMENTS OF THE INVENTION

Figure 1:
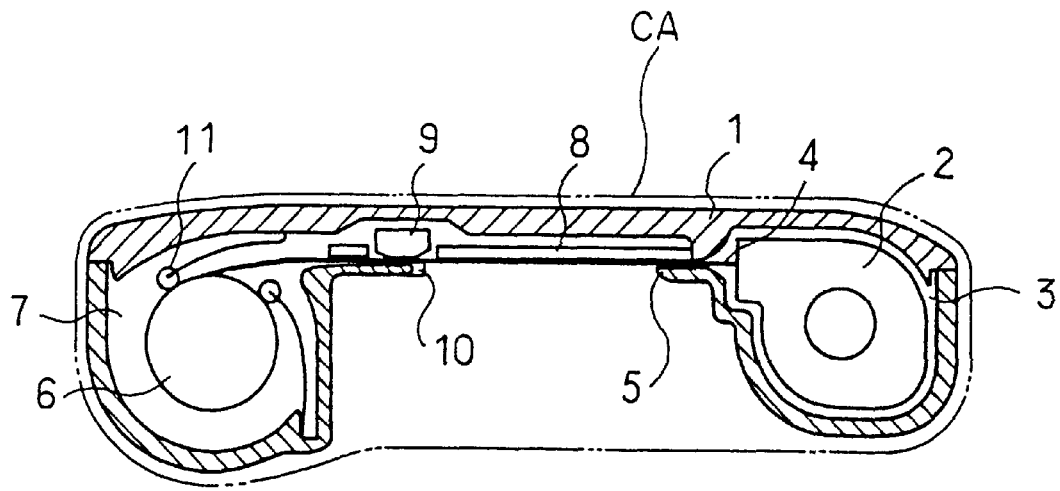
FIG. 1 is a schematic horizontal sectional view of a camera having a judgment device of an unexposed film frame according to an embodiment of the present invention.

Referring now to the drawings, an embodiment of the present invention will be described in detail.

FIG. 1 is a schematic horizontal sectional view of a camera having a judgment device of unexposed film frames. A body 1 of a camera CA comprises a cartridge chamber 3 to which a film cartridge 2 is to be loaded, an image forming section 5 where a film 4 is fed and in which an aperture that an image is formed by exposure is arranged, and a spool chamber 7 wherein a winding spool 6 for winding up a film is disposed, and the like. A film pressure plate 8 is arranged behind the film 4 at the image forming section 5, and a magnetic head 9 for magnetic recording and a pad 10 are arranged at a down-stream side of film feeding, and a film roller 11, for pushing down the film 4 being wound up to the winding spool 6, is disposed in the spool chamber 7. A photographing lens (not shown) and the like is arranged in front of the image forming section, and a covering case (shown in two-dots chain line) surrounds the body 1.

Figure 2:
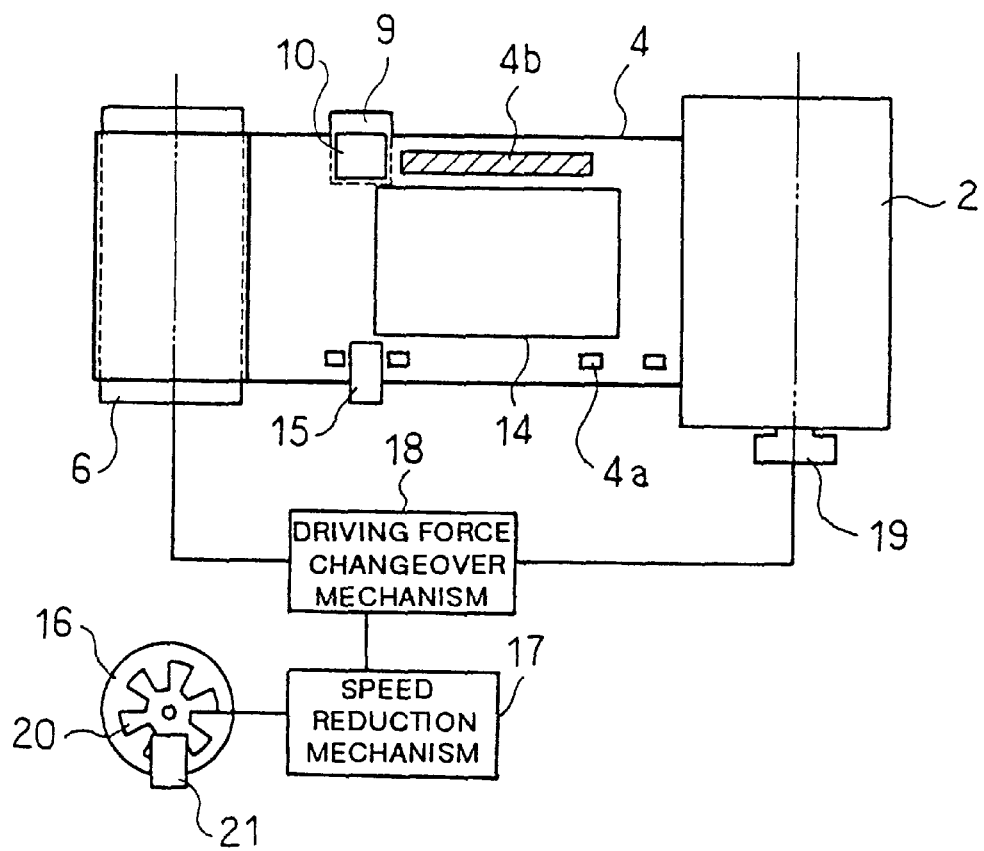
FIG. 2 is a structural view showing a film feeding system of the camera.

FIG. 2 is a structural view showing a film feeding system of the camera. As shown in the figure, a perforation 4*a* is disposed on a position corresponding to an each frame 14, and a perforation sensor 15 for counting the perforation 4*a* of the film 4 optically is arranged in the camera. Further, a magnetic recording section 4*b* (track) is arranged corresponding to a position of the magnetic head 9, and each frame 14. Moreover, a feeding motor 16 for feeding out and winding up the film 4 is disposed in the camera CA, and the output from the feeding motor 16 is connected with the winding spool 6 and a winding fork 19 through a speed reduction mechanism 17 and a driving force changeover mechanism 18. Furthermore, a blade wheel 20 is attached to a rotation shaft of the motor and a motor rotation detection sensor 21 is provided for detecting an amount of rotation of the blade wheel 20.

Figure 3:
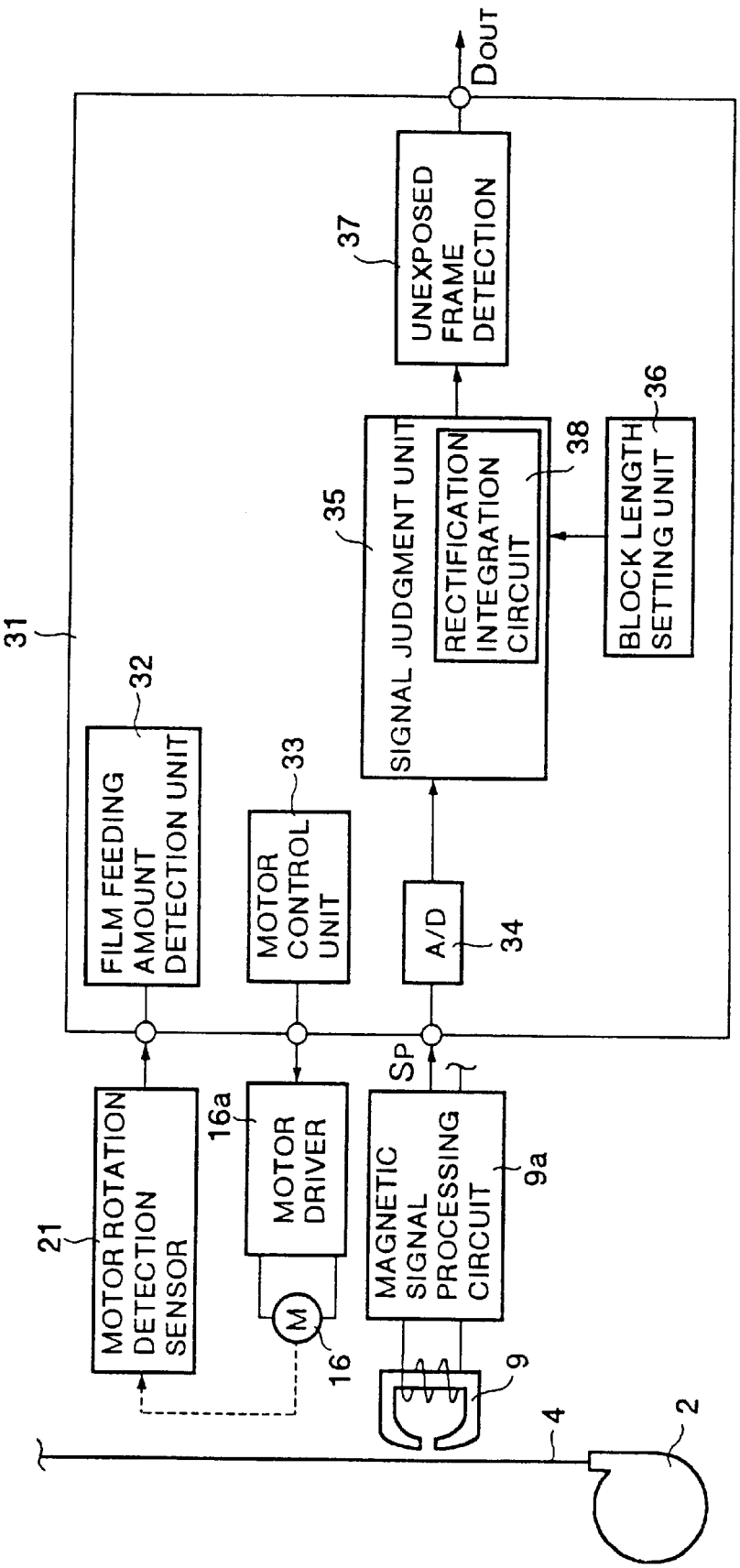
FIG. 3 is a block diagram showing a schematic structure for controlling a camera, FIG. 4 (*a*) is a view showing a magnetic output in a noise portion, which is read out by a magnetic head, and FIG. 4 (*b*) is a view showing a magnetic output in a signal portion, which is read out by the magnetic head, FIGS. 5 (*a*) and 5(*b*) show a waveform of noise and signal, wherein their amplitude is in the approximately same condition, and a waveform which is processed with rectification and integration.

FIG. 3 is a block diagram of a schematic structure for controlling a camera. A controller 31 for controlling the overall camera is composed of a microcomputer or a circuit construction containing a microcomputer. The controller 31 is composed of a film feeding amount (speed) detection unit 32, a motor controlling unit 33, an A/D converter 34 wherein detected signal, which are read out by the magnetic head 9, are inputted through a magnetic signal processing circuit 9*a* and the signal is converted to a digital signal, a signal judgment unit 35 for judging whether a signal exists or not by a block unit based on the digital signal from the A/D converter 34, a block length setting unit 36, an unexposed frame detection unit 37 for detecting unexposed frames based on the judgment output from the signal judgment unit 35, and the like. The signal judgment unit 35 contains a rectification and integration circuit 38 for rectifying and integrating a signal read out by the magnetic head 9, and it detects whether a signal exists or not by dividing signals, which are read out from the magnetic recording section 4*b*, into a plural blocks. A signal from the motor rotation detection sensor 21 is input to the film feeding amount (speed) detection unit 32, and the motor control unit 33 drives the motor 16 through a motor driver 16*a*. The operation of unexposed frame detection by the controller 31 will be explained later in detail.

Figure 4:
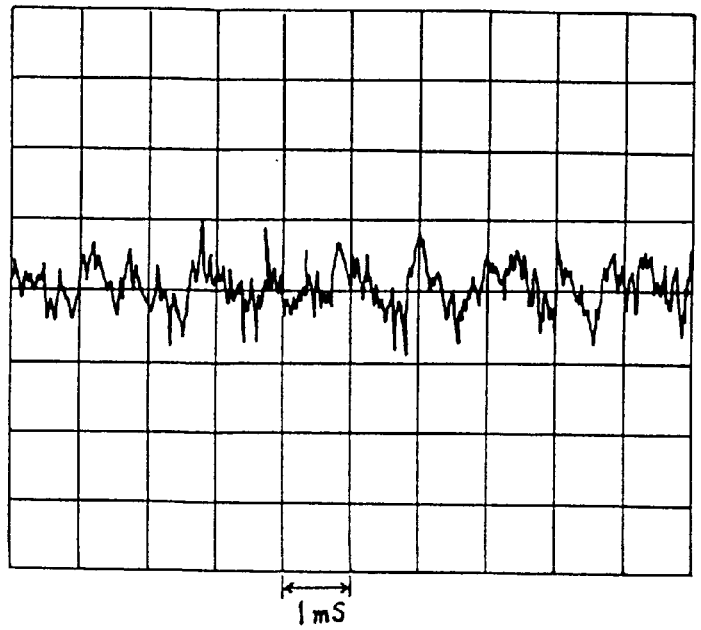
Figure 4:
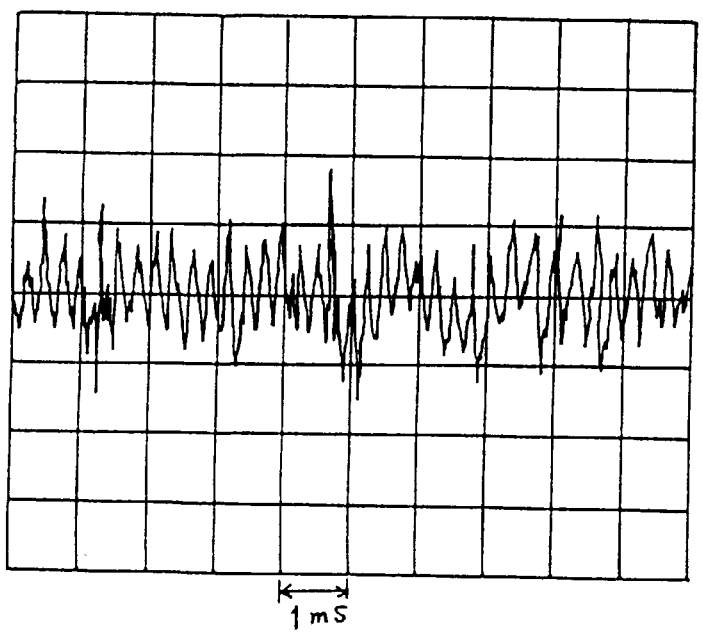

Now, referring to FIG. 4 (*a*) and FIG. 4 (*b*), FIG. 5, and FIG. 6, a principle of unexposed frame detection will be explained according to the embodied device. The unexposed frame detection is needed for determining the lead portion of unexposed frames amongst out previously exposed frames, and hence determining whether a film in a film cartridge is used not after the film has been rewound, and when the same film is loaded in the camera for reuse. FIG. 4 (*a*) shows a magnetic output in a noise portion, that is, a magnetic output read out by the magnetic head 9 in an film area with no signal originally except the magnetic recording portion. FIG. 4 (b) shows a magnetic output in a signal portion read out by the magnetic head 9, and in particular, it shows a state in which S/N ratio is reduced due to an increased amplitude of the noise portion with influences of various noises and little difference from an amplitude of the signal portion in signal amplitude itself, especially at a peak portion. FIG. 5 (a) shows an unprocessed waveform of noise (random) and a waveform after rectification and integration. FIG. 5 (b) shows an unprocessed waveform of a signal (signal having a component of a uniform frequency) and a waveform after rectification and integration. It is difficult to distinguish noise from signal with the comparison in the signal's amplitude (Vp), but the distinction can be executed easily by rectifying and integrating the noise portion and the signal portion so as to produce differences in the signal's output.

FIG. 6 shows a state in which it is detected whether a signal exists or not by dividing signals, which are at the magnetic recording section (track) arranged correspondingly on each frame, into a plural block units. For example, the signal is divided into 60 blocks, and the rectified and integrated value of the detected signal is compared with a predetermined threshold value (explained later), and if the rectified and integrated value is larger than the threshold value, the block is referred to as "1", and if it is smaller than the threshold value, it is referred to as "0". When "1" is successive more than a predetermined number (i. e., six), it is judged that the frame has a signal at the magnetic recording section. In this manner, the camera is able to obtain more accurate detection by dividing the signal portion into plural blocks, and detecting whether a magnetic signal exists or not at every divided block.

Figure 8:
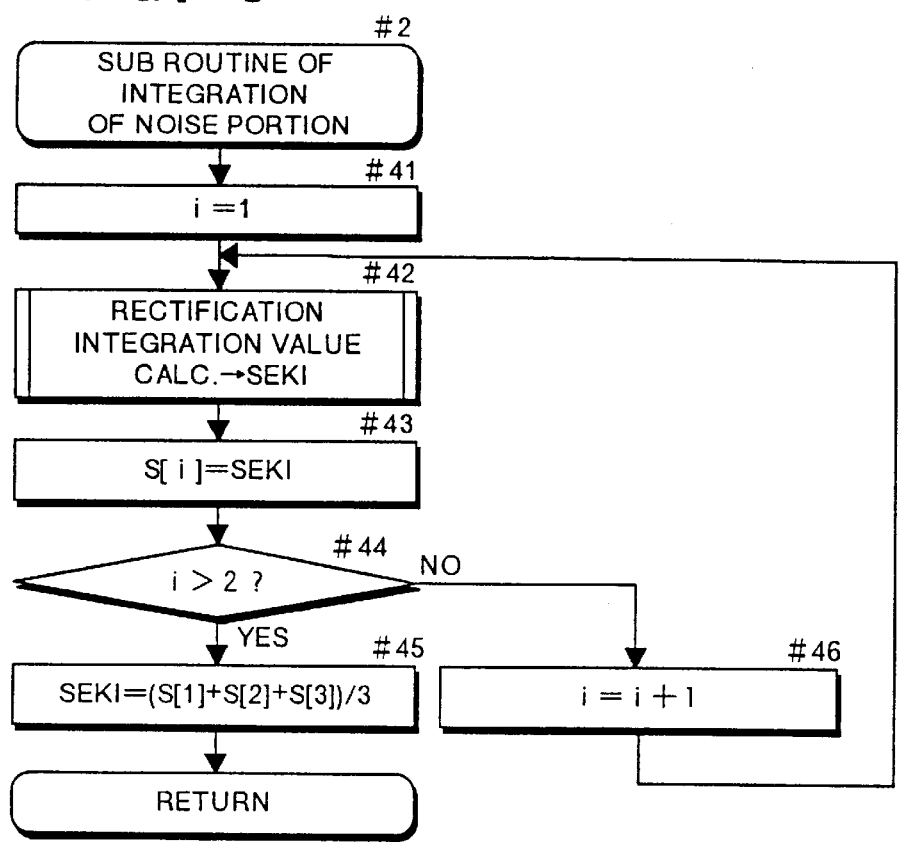
FIG. 8 is a flowchart of a sub-routine at a step #2, of FIG. 7
Figure 9:
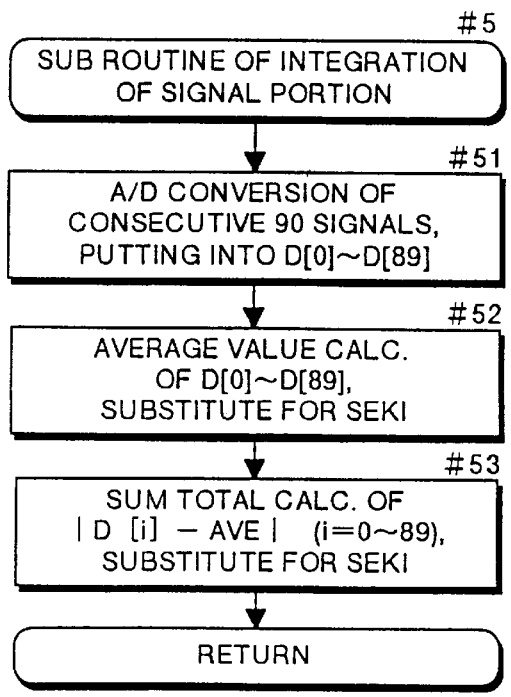
FIG. 9 is a flowchart of a sub-routine at a step #5, of FIG. 7

FIG. 7, FIG. 8, and FIG. 9 are flowcharts showing the first example of proceedings for unexposed frame detection. In FIG. 7, first of all, a film feeding starts from the film cartridge 2 loaded in a camera to the winding spool 6 (#1), then an integration value at the noise portion is detected by use of the rectification and integration circuit 38 in the signal detection unit 35 based on a signal read out by the magnetic head 9, and the integrated value is referred to as SEKI (#2). For the noise portion, an area, which is not used for magnetic recording at the lead portion of a film, is applied. FIG. 8 shows a sub-routine of integration at the noise portion. Based on the integrated value of the noise portion, two threshold values are obtained comprising a thr1, which is 1.5 times the integrated value, and a thr2, which is 2 times the integrated value, (values to be compared with the integrated value of the signal portion wherein thr1<thr2 (#3). Next, the perforation 4a of the film 4 is detected by the perforation sensor 15 (FIG. 2), and then a lead portion of magnetic track which corresponds to the first frame is detected (#4). Next, a signal section, that is, a signal at the magnetic track portion is read out by use of the rectification and integration circuit 38, and converted from analog signal to digital (90 signals), and divided by a predetermined unit (time length 3.6 ms) and an integrated value is obtained and the value is referred to as SEKI (#5). FIG. 9 shows a sub-routine of integration of the signal portion.

Thereafter, the integrated value SEKI is compared with thr1 and thr2 (#6, #8). As a result, if the integrated value SEKI of the signal portion is under thr1, it is determined that there is no magnetic signal in this portion and "0" is output (#9). If the integrated value of the signal portion is above thr2, it is determined that there is a magnetic signal and "1" is output (#7). Further, when thr1 is smaller than the integrated value SEKI at the signal portion, and the integrated value SEKI at signal portion is smaller than thr2 (thr1<SEKI<thr2), a counter C is increased by 1 (#10), and when the counter C is beyond a predetermined value (#11, YES), a detection whether a signal exists or not is deemed inaccurate, and, thus, detection of an unexposed frame is stopped (#12).

After that, until the length of magnetic track (22 millimeters) which corresponds to one frame is read throughout (#13, NO), the procedure returns to the step #5, and the above-mentioned procedure is repeated. For the detection at the step #13, if frames are fed one by one, the detection can be judged from the feeding speed of the film. When it is judged YES at the step #13, it proceeds to a step #14, and it judges whether a kind of a film is negative or not.

The reason why a kind of a film is detected at the step #14 is that the camera needs a different manner for detecting whether a frame is exposed or not, depending on the type of film because a spread state of magnetic substance at the magnetic recording section is different between a negative film and the other films, and the output of magnetic reading is different (e.g., the output of negative film is bigger). That is, if a film is not a negative film (#14, NO), and when there are more than three consecutive outputs "1" (#15, YES), the frame is judged to include a magnetic signal, and it is exposed (#18). When there are not more then three consecutive outputs "1" (#15, NO), the frame is judged to include no magnetic signal, and it is not exposed (#17). On the other hand, if a film is a negative film (#14, YES), when there are more than six consecutive outputs "1" (#16, YES), the frame is judged to include a magnetic signal, and it is exposed (#20). When there are not more than six consecutive outputs "1" (#16, NO), the frame is judged to include no magnetic signal and it is not exposed (#19).

When a frame is judged as an exposed frame (#18, #20), the procedure returns to the step #4, and the same procedure is repeated on the following frame. When the next frame is judged as an unexposed frame (#17, #19), the film feeding is stopped (#21, #26), the film is rewound more than one frame in order to photograph the unexposed frame subsequently, which is judged as an unexposed frame just beforehand (#22, #27), and the film is fed again so that the unexposed frame would come to an exposure aperture (#23, #28), and the procedure is finished.

In a sub-routine shown in FIG. 8, three integrated values S [1], S [2], and S [3] are obtained (#41~#44, #46), and their average value is obtained (#45). That is, since there is a possibility that an unevenness occurs in an output due to flaws, dust, and the like on a film even in a portion with no recorded data, integrated values are obtained at plural parts in order to reduce the possibility of wrong detection. Further, in a sub-routine shown in FIG. 9, 90 consecutive input signals are converted from analog to digital (#51), the average value AVE of the whole block is obtained (#52) and then a sum total of the differential of the value at each block and the average value AVE (#53)is obtained.

Figure 10:
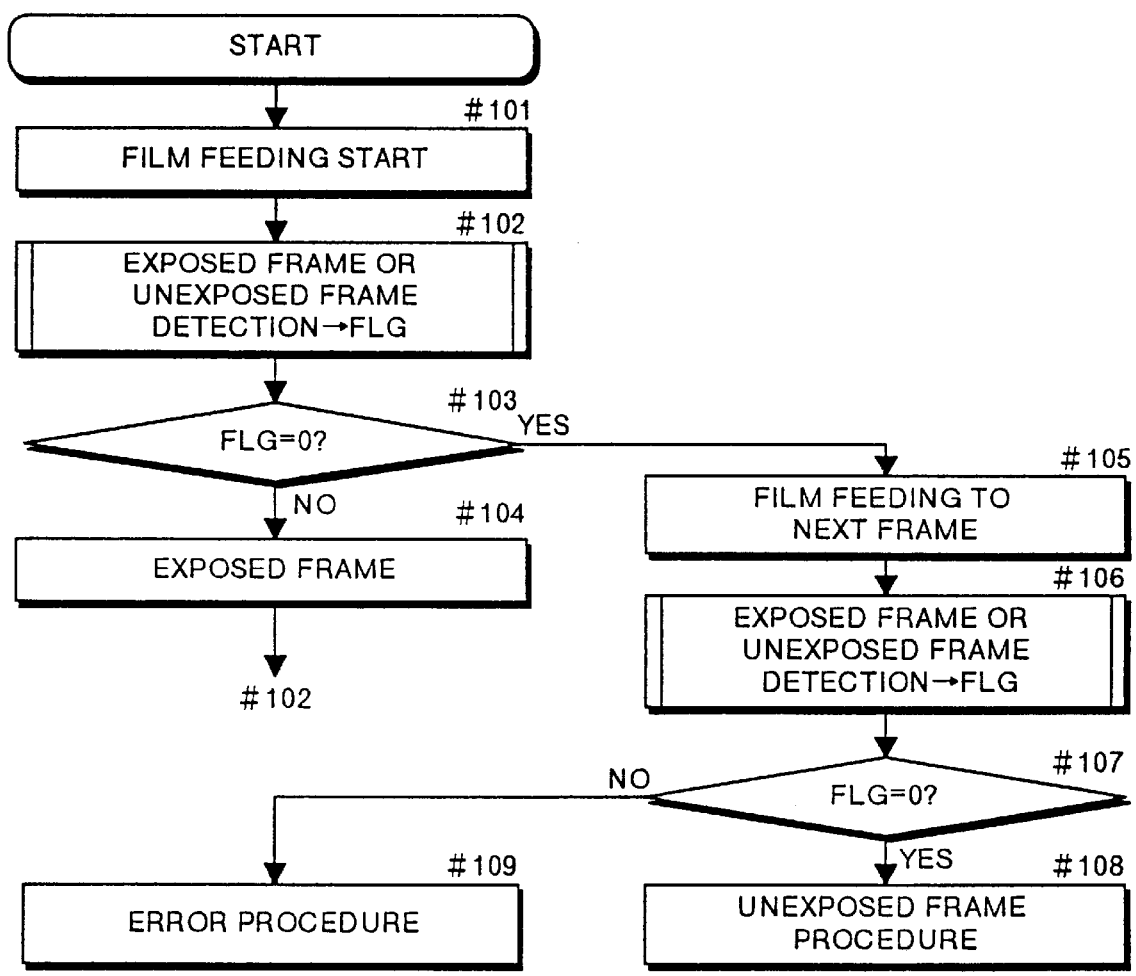
FIG. 10 is a main flowchart showing the second example of judging proceedings for unexposed frames.
Figure 11:
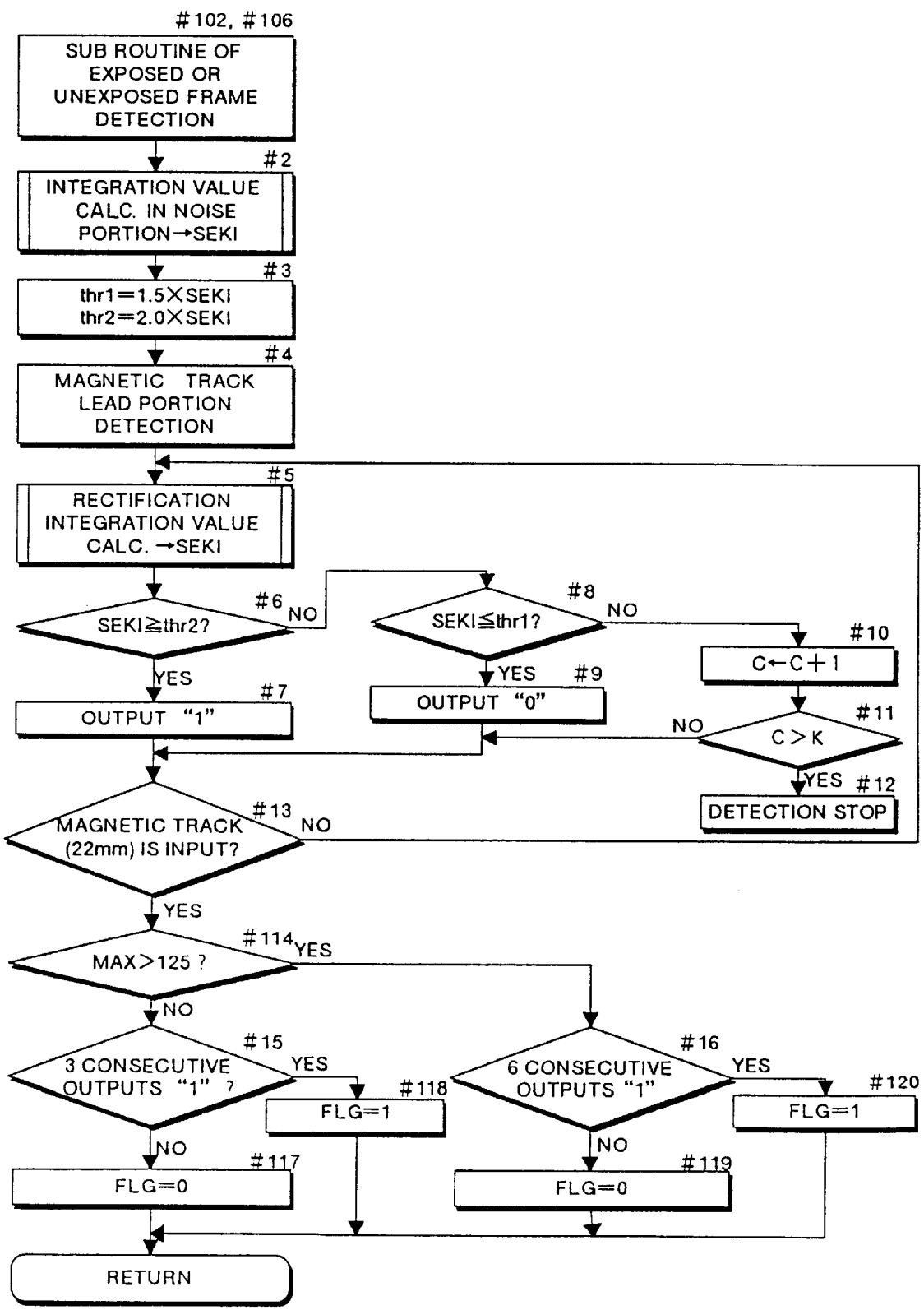
FIG. 11 is a flowchart of a sub-routine at steps #102 and #106, of FIG. 10
Figure 12:
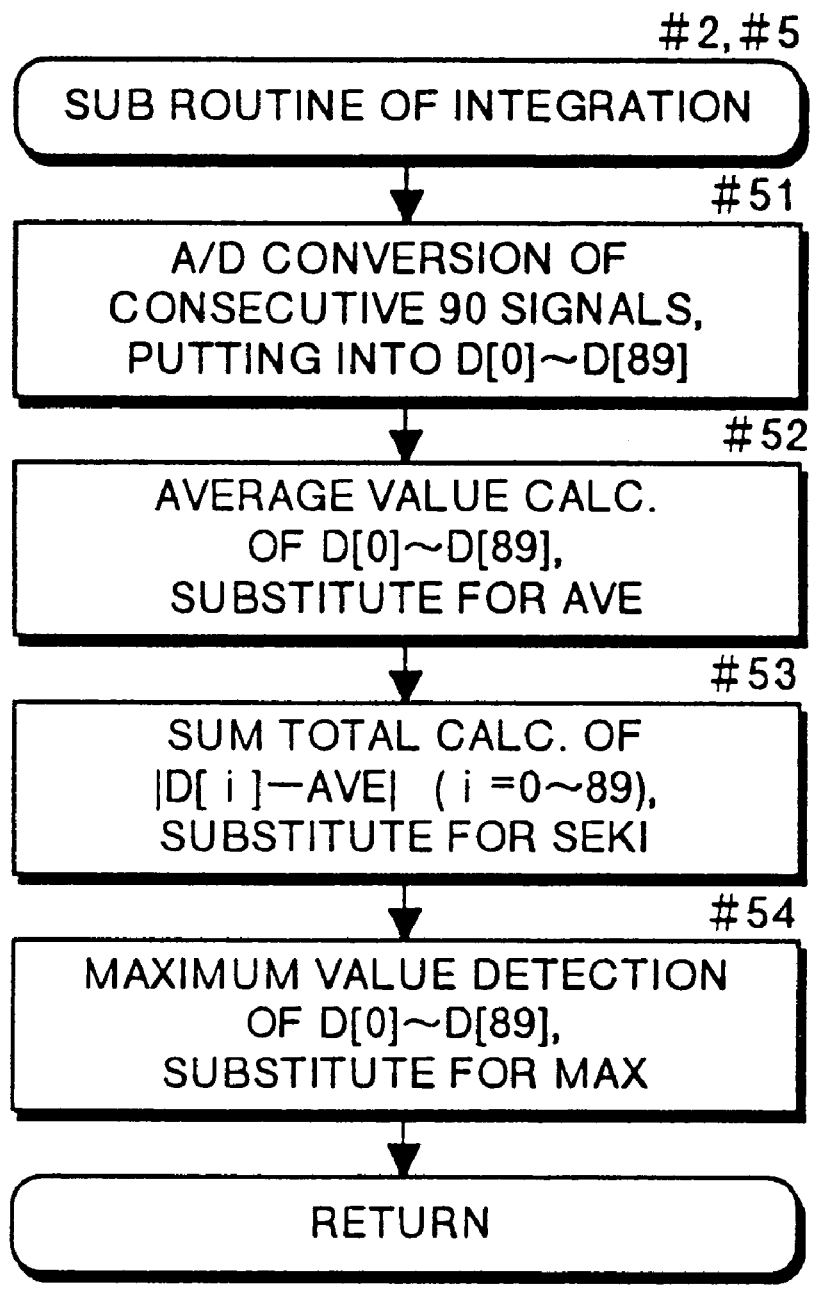
FIG. 12 is a flowchart of a sub-routine at the steps #2 and #5, of FIG. 10.

FIG. 10, FIG. 11, and FIG. 12 are flowcharts showing the second example of proceedings for unexposed frame detection. According to the second example, even if it is estimated that a frame is not exposed, it is not judged so immediately. Rather, the camera is able to judge the exposed state accurately by judging a state of the following frame for confirmation, in by judging in an output signal level. In FIG. 10, a film feeding starts at first (#101), then it is judged whether a frame is exposed or not by use of the rectification and integration circuit 38 based on the signal read out by the magnetic head 9, and the result is set at a flag FLG (#102). A sub-routine of this procedure is shown in FIG. 11

(explained later in detail). When a frame is estimated as an exposed frame, a FLG is set at "1", and when the frame is estimated as an unexposed frame, a FLG is set at "0". Then, it is checked whether the FLG is "0" (#103), and if the result is NO at the detection, the frame is judged as an exposed frame (#104), and then the procedure returns to the step #102, and the following frame is detected as being exposed or not.

When it Is YES at the above-mentioned detection of the step #103, since the presently judged frame is estimated as an unexposed frame, the film is fed to the following frame in order to check a state of the frame (#105). Then, the next frame is judged as being exposed or not in the same manner as the step #102 (#106, sub-routine is shown in FIG. 11). Thereafter, it is detected whether a FLG is "0" (#107). If the result is YES at the judgment, it means that two successive frames are not exposed, and an unexposed frame procedure is executed (#108). On the other hand, if the result is NO at the judgment, the next frame is estimated as an exposed frame, and since the previous frame has been estimated as previously not exposed such that a discrepancy occurs between the previous and the following frame, then an error procedure is executed (#109). In the unexposed frame procedure (#108), the film is rewound more than two frames and the film is fed again so that the lead portion of unexposed frames can be photographed.

An error procedure (#109) is a procedure, for example, in which the film is rewound completely and the operation is finished displaying on the camera or the film cartridge that the film can not be used.

For another error procedure, the film is rewound in a predetermined amount or completely, and judgment is executed again by repeating the procedure upward from the step #101. Then, when a FLG is "0" again at the step #107, judging that magnetic information of the film has a low reliability, the film is rewound completely, and the operation is finished, displaying on the camera or the film cartridge that the film can not be used.

Furthermore, for another error procedure, it may be that a film is judged whether it is exposed or not after detecting a state of the following third frame or more. In this case, the operations of #101~#107 are repeated in the step #109, and when the third frame or following frames are detected as unexposed frames, that is, FLG is "0", since there is a possibility that detection of the second frame, which has been judged as an exposed frame, is incorrect or there is an abnormality in exposing, the film is rewound and fed again so that it is able to photograph the third frame (lead portion of unexposed frames).

If there are frames which are judged as exposed frames after the third or more following frames, it is judged that magnetic information of the film has a low reliability, and the film are rewound completely, and the operation are finished displaying on the camera or the film cartridge that the film can not be used.

In FIG. 11, a sub-routine of the above-mentioned steps #102 and #106 will be now explained. In the sub-routine, the same step numbers are appended for the same proceedings of the flowchart in FIG. 7 and the different steps are as follows. Judging is distinguished according to a kind of film at the steps #14, #17~#20 as described before, but in the second example, the judging operation is distinguished according to a level of output signal at steps #114, #117~#120. Other different steps are that in addition to the same proceedings of the steps #51~#53 in FIG. 9, a maximum output signal at each block is obtained and referred to as MAX (#54) at the sub-routine for obtaining an integration value at steps #2 and #5 as shown in FIG. 12.

At the step #114, it is examined whether the maximum value MAX of an output signal (A/D converted value) is larger than 125 or not, which is a half of maximum steps 256 in case of the expressing the output signal using 8 bit. If the maximum output signal MAX is not larger than 125 (#114, NO), and when there are three consecutive outputs "1", which shows there is a signal (#15, YES), FLG is set at "1" (#118), which shows that the frame is exposed. When there are no three consecutive outputs "1" (#15, NO), FLG is set at "0" (#117), which shows that the frame is not exposed, and the procedure returns. On the other hand, if the maximum output signal MAX is larger than 125 (#114, YES), and when there are six consecutive outputs "1", which shows that there is a signal (#16, YES), FLG is set at "1" (#120), which shows that the frame is exposed, and when there are no six consecutive outputs "1" (#16, NO), FLG is set at "0" (#119), which shows that the frame is not exposed, and the procedure returns.

Figure 13:
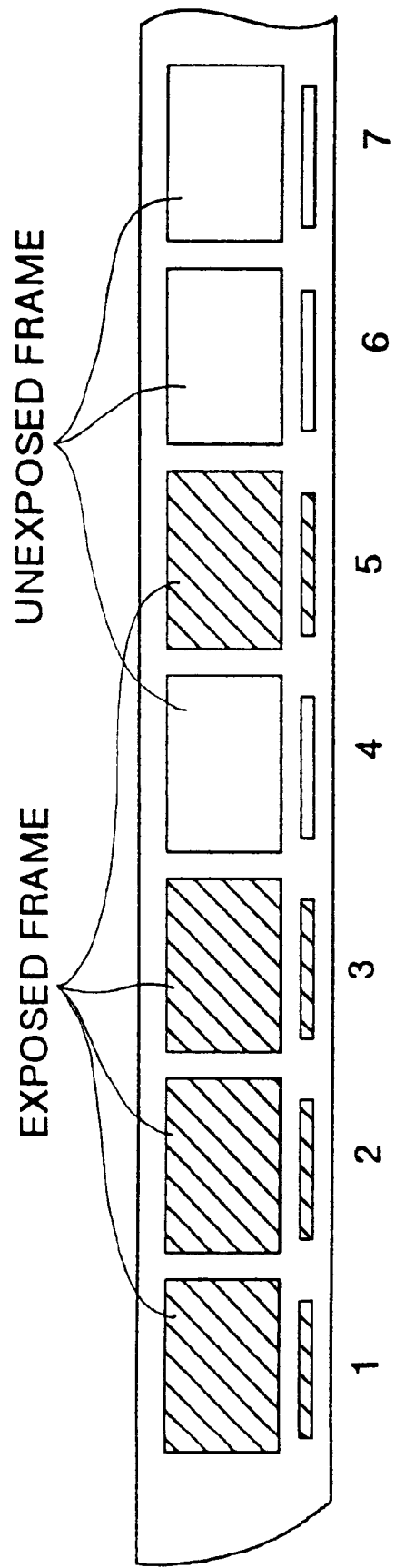
FIG. 13 is an explanatory view showing an effect which is obtained by the above two examples.

Referring to FIG. 13, it will be now explained that unexposed film detection can be executed more accurately by executing the above-mentioned routine in FIG. 10. According to the above routine, even if a frame is estimated as an unexposed frame at first, the following frames are detected, and if some successive frames can be judged as including a magnetic signal, it is judged that the frame is exposed, and if there is no such successive frames, it is judged that the frame is not exposed. In FIG. 13, hatched frames are exposed frames, and unhatched frames are unexposed frames. In this example, there is an abnormality; frames from the beginning to the third are exposed, the fourth frame is not exposed, the fifth frame is exposed, and the sixth and seventh frames are not exposed. In such a state, in addition to the abnormality of exposing, the recorded signal level may be decreased on only the fourth frame as a result of the abnormality of the recording operation of the magnetic signal regardless of a normal exposing. In this case, if it is detected whether frames are exposed or not one by one; the fourth frame is detected as not exposed and it is judged so immediately, next photographing starts from the fourth frame and then double exposing occurs on the fifth frame. In contrast, even if the fourth frame is estimated as not exposed, the camera is able to prevent double exposing by detecting the following frames as shown in a routine of FIG. 10.

This invention may be embodied in other specific forms without departing from the spirit or essential characteristics thereof. The present embodiment is therefore to be considered in all respects as illustrative and not restrictive. For example, at the steps #15 and #16 in FIG. 7 and FIG. 11, the consecutive numbers of output "1" is not restricted within the examples. Further, at #114 in FIG. 11, the values, which are to be compared with the maximum value MAX, are not restricted within the example. Moreover, at the step #2 in FIG. 11, noise may be detected in a state without a film in order to obtain an integrated value in response to a noise portion. Further, an apparatus according to the present invention, also encompasses an image apparatus and a printing apparatus for reading out an image from a photographed film, in addition to a camera.

What is claimed is:

1. An apparatus employing a film wherein predetermined data is recorded magnetically on a predetermined recording section arranged correspondingly on photographing frames of the film in response to photographing, comprising:

a reader which reads a kind of film which is loaded in the apparatus;

a magnetic head for detecting a magnetic signal recorded on the film;

a feeder which feeds a film for the magnetic head;

a magnetic signal reader which reads out and amplifies the signal output from the magnetic head; and, a controller which controls a comparing operation between an output from the magnetic signal reader and a predetermined threshold value, a judging operation which judges whether a magnetic signal is recorded or not on a film based on a result of a comparison performed in a first or second judgement procedures, and a selecting operation which selects the first judgement procedure or the second judgement procedure in response to a kind of a film.

2. The apparatus as claimed in claim 1, wherein the apparatus is a camera.

3. The apparatus as claimed in claim 1, wherein the reader judges whether a kind of a film is a negative film or a positive film.

4. The apparatus as claimed in claim 1, wherein, the controller further controls, a dividing operation in which a signal output from the magnetic signal reader is divided into plural blocks, a comparing operation in which the signal is compared with a predetermined threshold value in each of the divided blocks; and, a judging operation in which it is judged whether a magnetic signal exists or not based on whether an area contains successive instances in which the signal is greater than the predetermined threshold value more than a predetermined number or not, wherein the predetermined number varies depending on a kind of film.

5. An apparatus as claimed in claim 1, wherein different kinds of film are distinguished by their differing compositions.

6. An apparatus as claimed in claim 1, wherein the controller further controls an operation in which a maximum value of the magnetic signal is determined, wherein the selecting operation selects the first judgment procedure or the second judgment procedure on the basis of said maximum value.

7. An apparatus employing a film wherein predetermined data is recorded magnetically on a predetermined recording section arranged correspondingly on photographing frames of the film in response to photographing, comprising:

a magnetic head for detecting a magnetic signal recorded on the film;

a feeder which feeds a film for the magnetic head;

a magnetic signal reader which reads out and amplifies the signal output from the magnetic head; and, a controller which controls a judging operation which judges whether a magnetic signal is recorded or not at a recording section arranged on each frame correspondingly based on an output from the magnetic reader;

wherein said controller controls an exposure condition judgement in which an exposure condition of a frame is based on a result of judging a following next frame when a previous frame is judged to have no signal recorded thereon.

8. The apparatus as claimed in claim 7, wherein the apparatus is a camera.

9. The apparatus as claimed in claim 7, wherein the controller judges that the previous frame is an unexposed frame when the following next frame is judged to have no signals recorded on a recording section.

10. The apparatus as claimed in claim 7, wherein the controller controls a film feeding by the feeder so as to feed the film to a position in which an unexposed frame can be photographed when an unexposed frame is detected.

11. An apparatus employing a film wherein predetermined data is recorded magnetically on a predetermined recording section arranged correspondingly on photographing frames of the film in response to photographing, comprising:

a magnetic head for detecting a signal recorded on the film;

a feeder which feeds a film for the magnetic head;

a magnetic signal reader which reads out and amplifies the signal output from the magnetic head; and, a controller which controls a judging operation which judges whether a magnetic signal is recorded or not on a recording section arranged on each frame correspondingly based on an output from the magnetic signal reading device;

wherein said controller controls an exposure condition judgement in which it is judged that a previous frame is an unexposed frame when it is judged that a signal is not recorded in following plural successive frames.

12. The apparatus as claimed in claim 11, wherein the apparatus is a camera.

13. The apparatus as claimed in claim 11, wherein the controller judges a frame as an unexposed frame when two frames with no signals successively follow said previous frame.

14. An apparatus employing a film wherein predetermined data is recorded magnetically on a predetermined recording section arranged correspondingly on photographing frames of the film in response to photographing, comprising:

a magnetic head for detecting a signal recorded on the film;

a feeder which feeds a film for the magnetic head;

a magnetic signal reader which reads out and amplifies the signal output from the magnetic head;

a signal processor which rectifies and integrates a signal output from the magnetic head; and, a controller which controls a comparing operation between the rectified and integrated signal and a predetermined threshold value, and a judging operation which judges whether a magnetic signal is recorded on the film based on a result on the comparison.

15. The apparatus as claimed in claim 14, wherein the apparatus is a camera.

16. An apparatus as claimed in claim 14, wherein said threshold value is a based on a noise measurement value.

17. A method for locating an unexposed frame of a film comprising the steps of:

loading film in a film reading apparatus:

determining the kind of film loaded into the film reading apparatus;

providing a plurality of judgement procedures used to interpret an output of a magnetic signal reader;

selecting one of the plurality of judgement procedures on the basis of the kind of film determined in the determining step;

successively examining frames on said film until an unexposed frame is located, wherein said step of successively examining comprises the substeps of:

reading a signal from a magnetic portion corresponding to a film frame using the magnetic signal reader: and determining whether said signal indicates whether said frame is exposed or unexposed using said selected judgement procedure.

18. The method as claimed in claim 17, wherein said determining substep comprises the substeps of:

dividing the read signal into a plurality of blocks;

determining whether each of said blocks contains a signal indicative of an exposed frame;

counting a number of successive blocks containing a signal indicative of an exposed frame, and comparing said number with a predetermined threshold number, wherein said predetermined threshold number is selected on the basis of said kind of film.

19. The method as claimed in claim 17, wherein the kinds of film are distinguished by differing compositions.

20. The method as claimed in claim 17, wherein the plurality of different judgement procedures differ by comparing the read signal with respect to differing standards.

21. The method as claimed in claim 20, wherein said differing standards comprise differing thresholds.

22. A method for locating an unexposed frame of a film comprising the steps of:

loading film in a film reading apparatus;

successively examining frames on said film until an unexposed frame is located, wherein said step of successively examining comprises the substeps of:

reading a signal from a magnetic portion of a first film frame;

determining whether said signal indicates whether said first frame is exposed or unexposed;

reading a signal from a magnetic portion corresponding to at least one successive film frame;

determining whether said signal read from said at least one successive film frame indicates whether said at least one successive film frame is exposed or unexposed; and assessing that said first frame is an exposed frame if said first frame and said at least one successive frame are determined to be exposed film frames.

23. The method according to claim 22, further including the steps of:

measuring a noise value of said film pertaining to noise in said magnetic signal; and setting said threshold on the basis of said noise value.

24. A method for locating an unexposed frame of a film comprising the steps of:

loading film in a film reading apparatus;

successively examining frames on said film until an unexposed frame is located, wherein said step of successively examining comprises the substeps of:

reading a signal from a magnetic portion of a film frame;

integrating and rectifying said signal to produce an integrated and rectified signal; and comparing said integrated and rectified signal with a threshold value to determine whether the film frame is exposed or unexposed.

* * * * *